US012380682B2

(12) United States Patent
Nagori et al.

(10) Patent No.: US 12,380,682 B2
(45) Date of Patent: Aug. 5, 2025

(54) MULTI-LABEL IMAGE CLASSIFICATION IN A DEEP LEARNING NETWORK

(71) Applicant: Texas Instruments Incorporated, Dallas, TX (US)

(72) Inventors: Soyeb Noormohammed Nagori, Bangalore (IN); Manu Mathew, Bangalore (IN); Debapriya Maji, Bangalore (IN); Pramod Kumar Swami, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 694 days.

(21) Appl. No.: 17/555,435

(22) Filed: Dec. 18, 2021

(65) Prior Publication Data
US 2022/0327810 A1 Oct. 13, 2022

Related U.S. Application Data
(60) Provisional application No. 63/173,590, filed on Apr. 12, 2021.

(51) Int. Cl.
*G06V 10/774* (2022.01)
*G06N 3/082* (2023.01)
*G06V 10/82* (2022.01)

(52) U.S. Cl.
CPC ......... *G06V 10/7747* (2022.01); *G06N 3/082* (2013.01); *G06V 10/82* (2022.01)

(58) Field of Classification Search
CPC ...... G06N 3/045; G06N 3/0464; G06N 20/00; G06N 3/047; G06N 3/082; G06N 3/02; G06V 10/82; G06V 10/764; G06V 20/695; G06V 10/44; G06V 10/25; G06V 10/806; G06V 30/19173; G06V 40/172; G06V 30/413; G06V 30/14; G06V 10/7747; G06T 2207/20084; G06T 7/70; G06T 7/73; G06T 2207/20076; G06T 3/4046; G06T 5/60;
(Continued)

(56) References Cited

U.S. PATENT DOCUMENTS 11,074,478 B2 * 7/2021 Mau ................. G06V 10/764
11,228,709 B2 * 1/2022 Athreya .................. G06T 5/50
(Continued)

OTHER PUBLICATIONS

N. Zhang, H. Shi, L. Chen, T. Lin and X. Shao, "A Novel CNN Architecture on FPGA-based SOC for Remote Sensing Image Classification," 2019 IEEE International Conference on Signal, Information and Data Processing (ICSIDP), Chongqing, China, 2019, pp. 1-5, doi: 10.1109/ICSIDP4782120199173500. (Year: 2019).*
(Continued)

*Primary Examiner* — Aaron W Carter
*Assistant Examiner* — Courtney Joan Nelson
(74) *Attorney, Agent, or Firm* — Carl G. Peterson; Frank D. Cimino

(57) ABSTRACT

A method for multi-label image classification in a convolutional neural network (CNN) is provided that includes forming a composite image from a plurality of clipped images, and processing the composite image by the CNN to generate a probability vector for each clipped image of the plurality of clipped images, wherein a length of a probability vector is equal to a number of classes the CNN is designed to classify.

22 Claims, 5 Drawing Sheets

(58) Field of Classification Search
CPC ..... G06T 3/4038; G06F 18/214; G06F 18/24; G06F 18/254; G06F 18/213; G06F 16/50; G06F 2218/08; G06F 2218/12; G01N 15/1433

See application file for complete search history.

(56) References Cited

U.S. PATENT DOCUMENTS

| | | | | |
|---|---|---|---|---|
| 2018/0322623 | A1* | 11/2018 | Memo | G06N 3/084 |
| 2019/0096135 | A1* | 3/2019 | Dal Mutto | G06F 18/24765 |
| 2020/0364867 | A1* | 11/2020 | Georgescu | G06F 18/24133 |
| 2020/0401851 | A1* | 12/2020 | Mau | G06F 16/583 |
| 2021/0042580 | A1* | 2/2021 | Chen | G06N 3/08 |
| 2022/0157048 | A1* | 5/2022 | Ting | G06V 10/82 |

OTHER PUBLICATIONS

S. A. Shahriyar, K. M. Rokibul Alam, S. S. Roy and Y. Morimoto, "An Approach for Multi Label Image Classification Using Single Label Convolutional Neural Network," 2018 21st International Conference of Computer and Information Technology (ICCIT), Dhaka, Bangladesh, 2018, pp. 1-6 (Year: 2018) doi: 10.1109/ICCITECHN.2018.8631970. (Year: 2018).*

"TDA4VM Jacinto Processors for ADAS and Autonomous Vehicles Silicon Revisions 1.0 and 1.1", TDA4VM-Q1, TDA4VM, Texas Instruments Incorporated, Feb. 2019, revised Aug. 2021, pp. 1-323.

* cited by examiner

MULTI-LABEL IMAGE CLASSIFICATION IN A DEEP LEARNING NETWORK

CROSS-REFERENCE TO RELATED APPLICATIONS

This application claims benefit of U.S. Provisional Patent Application No. 63/173,590 filed Apr. 12, 2021, which application is incorporated herein by reference in its entirety.

BACKGROUND OF THE DISCLOSURE

Embedded computer vision systems capable of performing on-device deep learning image classification are being deployed in applications in many different industries including assembly, collaborative robotics, medical technology, drones, driver assistance, and autonomous driving. In such computer vision systems, the deep learning image classification is often implemented using convolutional neural networks (CNNs) which may demand a lot of processing throughput from embedded processors, e.g., a system on a chip (SoC), with tight resource constraints in terms of performance, energy consumption, and memory capacity. Further, while there are many SoCs that provide specialized accelerators used for computer vision systems, efficient use of such resources is important for CNN performance.

SUMMARY

Embodiments of the present disclosure relate to multi-label classification in a deep learning network. In one aspect, a method for multi-label image classification in a convolutional neural network (CNN) is provided that includes forming a composite image from a plurality of clipped images, and processing the composite image by the CNN to generate a probability vector for each clipped image of the plurality of clipped images, wherein a length of a probability vector is equal to a number of classes the CNN is designed to classify.

In one aspect, a computer readable medium storing software instructions for a multi-label image classification convolutional neural network (CNN) is provided in which the software instructions include software instructions to form a composite image from a plurality of clipped images, and process the composite image by the CNN to generate a probability vector for each clipped image of the plurality of clipped images, wherein a length of a probability vector is equal to a number of classes the CNN is designed to classify.

In one aspect, a digital device is provided that includes at least one processor, and a memory storing software instructions for a multi-label image classification convolutional neural network (CNN) for execution by the at least one processor, the software instructions including software instructions to form a composite image from a plurality of clipped images, and process the composite image by the CNN to generate a probability vector for each clipped image of the plurality of clipped images, wherein a length of a probability vector is equal to a number of classes the CNN is designed to classify.

In one aspect, a method for training a multi-label image classification convolutional neural network (CNN), the method including forming a plurality of composite images, wherein each composite image comprises a plurality of training images, processing the plurality of composite images by the CNN to generate class probabilities for each training image, and updating coefficients of the CNN based on the class probabilities for each training image.

In one aspect, a computer system is provided that includes at least one processor, and a memory storing software instructions for training a multi-label image classification convolutional neural network (CNN) for execution by the at least one processor, the software instructions including software instructions to form a plurality of composite images, wherein each composite image includes a plurality of training images, process the plurality of composite images by the CNN to generate class probabilities for each training image, and update coefficients of the CNN based on the class probabilities for each training image.

BRIEF DESCRIPTION OF THE DRAWINGS

Particular embodiments will now be described, by way of example only, and with reference to the accompanying drawings:

FIG. 7 is a simplified block diagram of a computer system that may be used to train a multi-label image classification CNN.

DETAILED DESCRIPTION OF EMBODIMENTS OF THE DISCLOSURE

Figure 1:
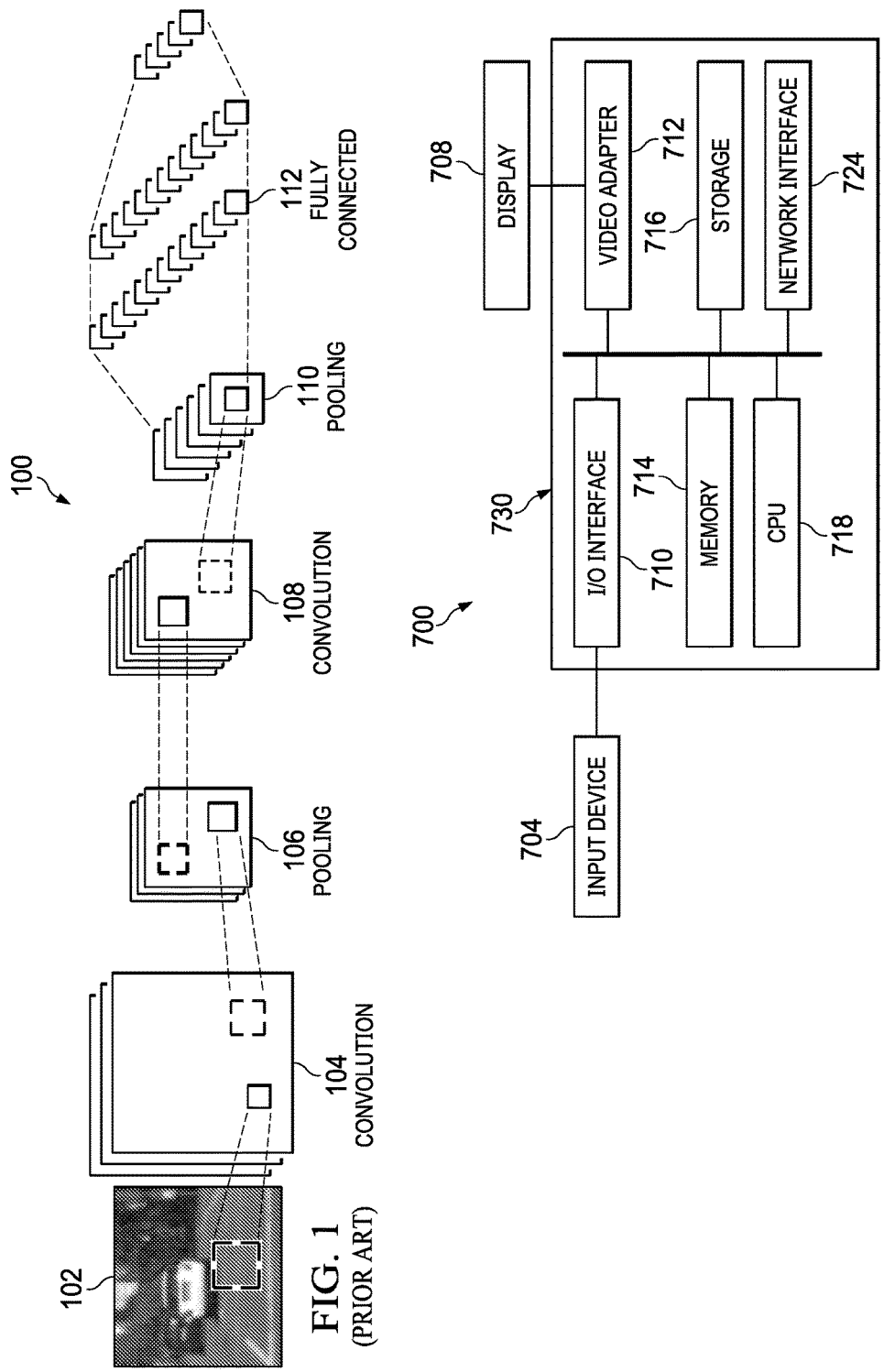
FIG. 1 is an example of a convolutional neural network (CNN)

Specific embodiments of the disclosure are described in detail with reference to the accompanying figures. Like elements in the various figures are denoted by like reference numerals for consistency.

As previously mentioned, deep learning image classification is often implemented as a convolutional neural network (CNN). A prior art CNN trained for image classification takes a single image as input and applies some number of convolution and subsampling layers to extract image features from the image followed by one or more fully connected layers as used in traditional neural networks to perform classification, i.e., to label the image, based on the extracted features. In general, a label corresponds to a class the CNN is designed to classify. The input to the initial convolution layer is a single m×n×r image where m is the height of the image, n is the width of the image, and r is the number of channels, e.g., for an RGB image, r=3. The output of each convolution layer and each subsampling layer is a set of feature maps which are the input to the next layer in the CNN. The number of feature maps generated by a convolution layer is equal to the number of filters applied by the convolution layer.

Each convolution layer includes some number of filters, the size and number of which may be different for each layer. Further, the filters may differ across the input feature maps. The coefficients or weights of the filters are determined by training the CNN with a set of training images. The trained filters act as feature detectors from the original input image.

In the initial convolution layer, each filter of the layer is convolved with the image to produce a feature map corresponding to the filter. In subsequent convolution layers, filters are convolved with input feature maps to produce output feature maps.

Convolution may be performed as follows. Initially, a filter is centered on the top left location of the feature map or image. An element wise multiplication is then performed between the filter and the elements in the patch covered by the filter and the results of the multiplications are added. The result of the addition is the value of the corresponding location in the output feature map. The filter is then moved by one or more locations to the right, i.e., by a stride value, and the computation is repeated to determine the next value of the output feature map. The stride amount may vary for each filter. Once a row is processed, the filter is moved down one or more locations to another row as specified by the stride and the computations are performed across the row. The computation ends when all rows of the input feature map or image selected as per the stride are processed. Note that for some locations of the filter in the input feature map or image, element values are not available, e.g., for locations at the boundaries of the input feature map or image. In such cases, zero padding may be used. Further, the convolution output of multiple input feature maps corresponding to channels may be added together to form one output feature map.

The feature maps resulting from a convolution layer may be processed by applying a non-linear operation, i.e., an activation function, to make the CNN more effective. A non-linear activation function makes a CNN much more accurate in image recognition tasks because the problem that is solved by the CNN may be complex and non-linear while convolution is linear. One common activation function used is the rectified linear unit (ReLU) which is applied per element in a feature map and replaces all negative values with zero. This specific type of activation function may be referred to as rectification.

Each subsampling layer, which may also be referred to as a pooling layer, reduces the dimensionality of the input feature maps while retaining the most important information. The subsampling can be of different types, e.g., max pooling, average pooling, or striding. A pooling subsampling layer does not change the number of feature maps.

Once the features of the input image are extracted by the convolution layers and downsampled by any pool layers, the final feature maps may be transformed or flattened to a one dimensional array for input to one or more fully connected layers in which every input is connected to every output by a weight value learned when the CNN is trained. The one or more fully connected layers map the features to the final outputs of the CNN, e.g., the probabilities for each class the CNN is designed to classify. The final fully connected layer may have the same number of output nodes as the number of classes the CNN is designed to classify. The outputs of the final fully connected layer may be provided to a Softmax layer to assign decimal probabilities to each class in which the decimal probabilities add up to 1.0. The Softmax function is defined as per $$softmax(z_i) = \frac{\exp(z_i)}{\sum_j z_j}$$

where j is the number of classes.

FIG. 1 is an example of the process flow of a simple convolutional neural network (CNN) 100 that classifies a single input image into one of four classes. More specifically, the CNN 100 includes two convolution layers outputting feature maps 104, 108. Each convolution layer is followed by a respective subsampling layer outputting feature maps 106, 110. The final pooling layer is followed by two fully connected layers 112 that classify the image 102 based on the features extracted by the convolution and pooling layers. In the example of FIG. 1, two sets of alternating convolution and pooling layers are shown. The Softmax layer is not shown. In practice, a CNN may have many of each type of layer. Further, more than one convolution layer may be performed before a pooling layer.

As previously mentioned, the coefficients or weights of the filters are determined by training the CNN with a set of training images. The number of filters and the sizes of the filters, the numbers and types of layers, and other parameters are determined prior to the training process and do not change during training. Only the filter coefficients are updated. The training process may be performed in multiple epochs in which each epoch includes one training pass over all the training images. A common training process for an image classification CNN is mini-batch learning, also referred to as mini-batch gradient descent. In mini-batch learning, the set of training images is divided into small non-overlapping batches. The number of epochs and the size of the mini-batches may be determined empirically.

The training process may be summarized as follows. At the beginning of the first epoch, the filter coefficients of all filters in the CNN are initialized with random values. Each subsequent epoch uses the filter coefficients updated in the previous epoch. In each epoch, each mini-batch of training images is processed as follows to update the filter coefficients. A forward propagation pass and a backward propagation pass are performed for each training image in the mini-batch of training images. A forward propagation pass includes processing all images in a mini-batch through the convolution, pooling, and fully connected layers of the CNN to output a probability for each class and computing the total error or loss of the probabilities using a loss function. A backward propagation pass is performed to compute an estimation of the gradient of the total error with respect to all the filter coefficients. After a gradient has been estimated for all the training images in the mini-batch, a mini-batch gradient is computed as the sum of the estimated gradients. Gradient descent is then used to update the filter coefficients to minimize the total error.

Prior art image classification CNNs are designed to inference on one image at a time, which may be referred to as single label classification. The training of such CNNs is also designed to process one image at a time. In many image classification applications, the images to be classified are small, e.g., 16×16 or 32×32, and classifying such small images may not be computationally efficient, especially on embedded systems with accelerators supporting deep learning. For example, image classification CNNs perform a lot of matrix multiplications. Embedded systems may include a matrix multiplication accelerator (MMA) to improve matrix multiplication throughput. However, the width and/or height of the feature maps for such small images may be smaller than the panel width/height of the MMA.

Further, many of the hardware/software design tradeoffs made to support computer vision applications take into consideration much higher resolution images, e.g., 1024×512 or 2048×512. In addition, there may be a fixed amount of overhead processing cycles per layer of a CNN, which becomes significant when smaller images are classified as compared to larger images. In real time computer vision applications such as autonomous driving and driver assistance systems, approximately twenty to forty small regions of interest (ROIs) may be cropped from a single larger input image or multiple larger images for classification purposes, e.g., to determine if an object in the ROI is a stop sign, a yield sign, etc. Such ROIs may be referred to as cropped images herein.

Embodiments of the disclosure provide for optimizing deep learning classification of cropped images by performing multi-label classification, i.e., by classifying or labelling multiple cropped images with a single pass through a CNN, rather than the prior art single label classification. More specifically, several cropped images of the same dimensions, e.g., 3×16×16, are "stacked together" in rectangular tile form to create a single composite image to be processed by a CNN to classify or label all the cropped images in the composite image simultaneously. The cropped images may be cropped from a single larger image or may be cropped from multiple larger images.

The feature map generation layers of the CNN, e.g., convolution, pooling, etc., prior to the final flattening of the feature maps may be the same as for performing single label classification on a single image while the flattening layer and any fully connected layers are implemented to be cognizant that the input feature maps contain features from multiple cropped images. This approach to multi-label classification allows the feature map generation layers of an existing image classification CNN designed to perform single label classification to be used for multi-label classification by modifying the flattening layer and any fully connected layers and retraining the CNN. Embodiments of the disclosure also provide for training of multi-label image classification CNNs.

Figure 2:
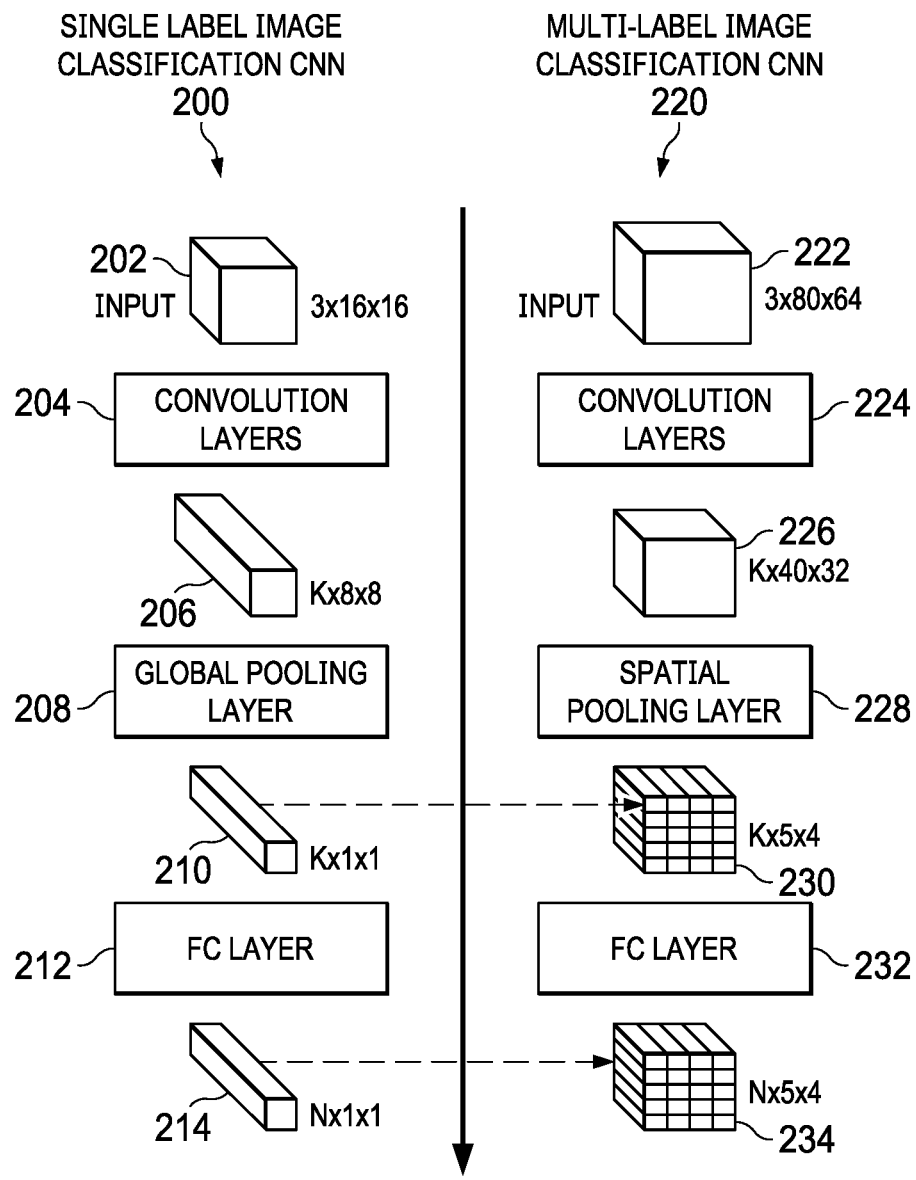
FIG. 2 is an example illustrating a multi-label image classification CNN in comparison to a single label image classification CNN.

FIG. 2 is an example illustrating a multi-label image classification CNN 220 in comparison to a single label image classification CNN 200 in accordance with some embodiments. Referring first to the single label image classification CNN 200, the input to the CNN 200 is single 3×16×16 clipped image 202 The clipped image 202 is passed through some number of convolution layers 204 in which one convolution layer uses a stride of 2, thus reducing the dimensions of the feature maps to 8×8 and the other convolution layers use a stride of 1. A final set of K 8×8 feature maps 206 is output by the convolution layers 204. The set of K×8×8 features maps is then flattened to a K×1×1 feature vector 210 in a global pooling layer 208. The global pooling layer 208 downsamples each 8×8 feature map into a 1×1 array by taking the average of all the elements of the feature map. The feature vector 210 is then processed by a fully connected layer 212 to generate an N×1×1 vector of class probabilities, where N is the number of classes the CNN 200 is designed to classify. More specifically, the vector includes N probability values, one for each class the CNN 200 is designed to classify, where each probability value corresponds to a class and indicates the probability that the image is of that class. The N×1×1 vector is then processed by a Softmax layer (not shown) to generate a probability distribution between 0 and 1.0.

Referring now to the multi-label image classification CNN 220, the input to the CNN 220 is a 3×80×64 composite image 222 of twenty 3×16×16 clipped images. The composite image 222 is passed through some number of convolution layers 224 to generate a final set of K 40×32 composite feature maps 226. The convolution layers 224 may be the same as the convolution layers 204 except that the filter coefficients may differ as the CNN 200 is trained with single images while the CNN 220 is trained with composite images. Training with composite images is described herein in reference to FIGS. 3 and 5. Each of the K composite feature maps includes twenty feature maps, one for each of the twenty clipped images in the composite image 222. As previously mentioned, one convolution layer uses a stride of 2, thus reducing the dimensions of the feature maps for each clipped image to 8×8 and the other convolution layers use a stride of 1.

The K×40×32 composite feature maps are then reduced to K×5×4 feature vectors 230 in a spatial pooling layer 228. The spatial pooling layer 228 downsamples each 8×8 feature map in a composite feature map into a 1×1 array by taking the average of all the elements of the 8×8 feature map. The result is twenty K×1×1 feature vectors, one for each of the twenty clipped images in the composite image 222. Each of the twenty feature vectors 230 is then processed one at a time by a fully connected layer 232 to generate N×5×4 vectors of class probabilities 234, one for each of the 20 clipped images in the composite image 222, where N is the number of classes the CNN 200 is designed to classify. Each N×1×1 vector is then processed by a Softmax layer (not shown) to generate a probability distribution between 0 and 1.0 for each clipped image.

Figure 3:
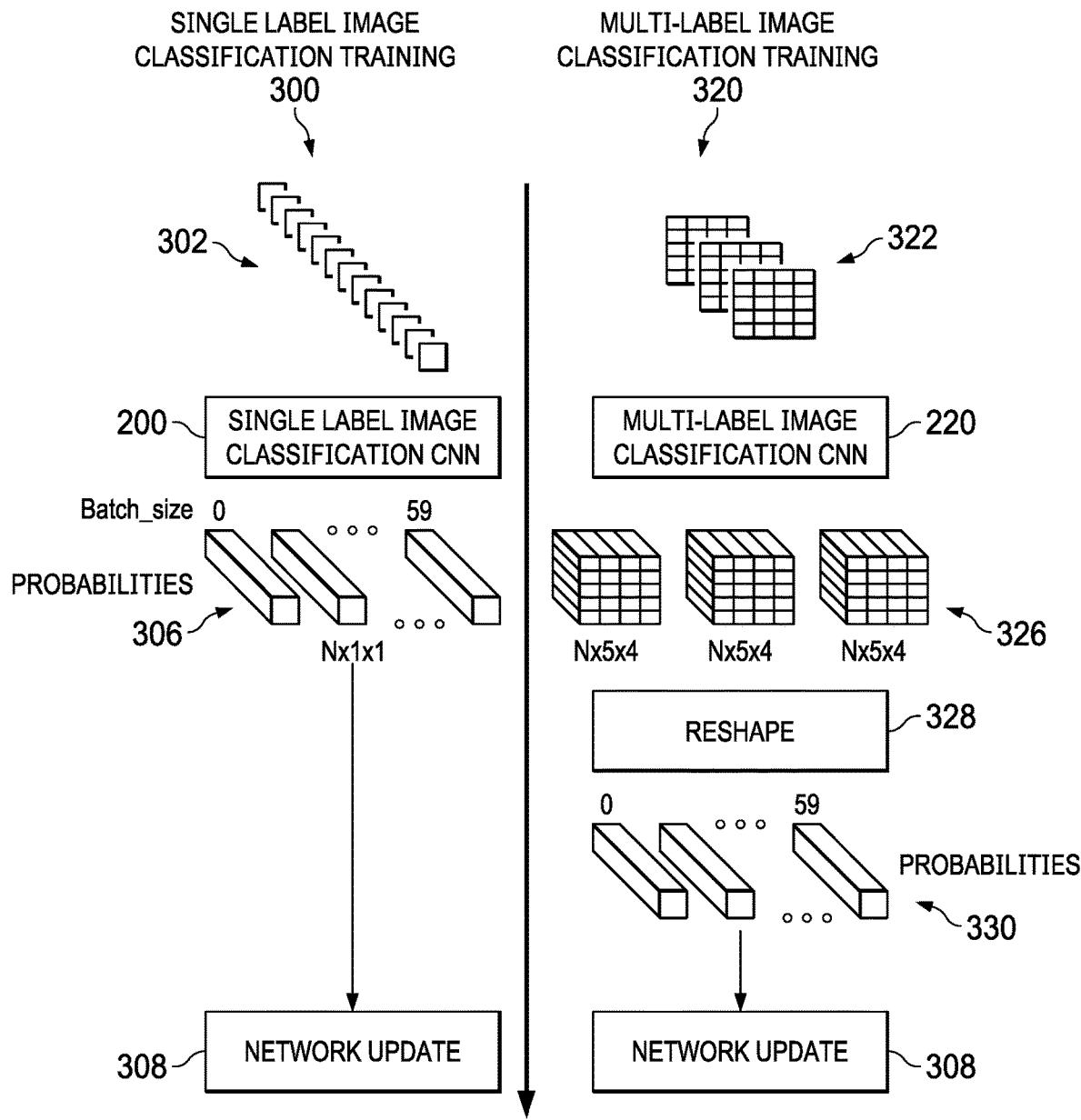
FIG. 3 is an example illustrating training a multi-label image classification CNN in comparison to training a single label image classification CNN.

FIG. 3 is an example illustrating training a multi-label image classification CNN 220 in comparison to training a single label image classification CNN 200 in accordance with some embodiments. The training approach is the previously mentioned mini-batch training in which the set of training images is divided in multiple mini-batches in each epoch. This example illustrates the processing of one mini-batch and the size of the mini-batch is assumed to be sixty images for simplicity of explanation. Other mini-batch sizes may be used. The illustrated mini-batch processing is repeated in each epoch for all mini-batches of the training set of images. In some embodiments, the order of the training images may be shuffled between epochs so the content of the mini-batches is not identical in each epoch. The size of the images in the training set is assumed to 3×16×16. Other sizes may be used. In general, the size of the images in the training set is determined by the expected size of the clipped images the CNN will be used to classify.

Referring first to the single label image classification training 300, each of the 3×16×16 images of the mini-batch of training images 302 is individually processed by the single label classification CNN 200 to generate sixty probability vectors 306 of length N, one for each of the images in the mini-batch, where N is the number of classes. That is, forward propagation is performed for each of the images in the mini-batch to generate a probability vector for the image. A network update component 308 uses the content of the probability vectors 306 to update the coefficients of the filters in the CNN 200. The network update component 308 executes a loss function to compute the total loss or error across all the probability vectors and then performs back propagation to estimate the gradient of the total error with respect to all the filter coefficients. The network update component 308 then uses gradient descent to update the filter coefficients to minimize the total error in which the coefficients are adjusted in proportion to their contribution to the total error.

Referring now to the multi-label image classification training 320, the sixty 3×16×16 images in the mini-batch of training images are formed into three 3×80×64 composite images 322. Each of the composite images 322 is individually processed by the multi-label classification CNN 220 to generate three sets of N 5×4 matrices of class probabilities 326, where each 5×4 matrix includes a probability value for each of the twenty training images in a composite image. That is, forward propagation is performed for each of the composite images to generate N probability matrices containing twenty probability values for the composite image, one for each training image in the composite image, where N is the number of classes. A reshape component 328 then rearranges the three sets of N 5×4 matrices of class probabilities into sixty individual probability vectors 330 of length N, one for each of the sixty training images, for input to the network update component 308. Each of the probability vectors is individually processed by the network update component 308. In this example, the network update component is the same for both the single label image classification training 300 and the multi-label image classification training 320.

Figure 4:
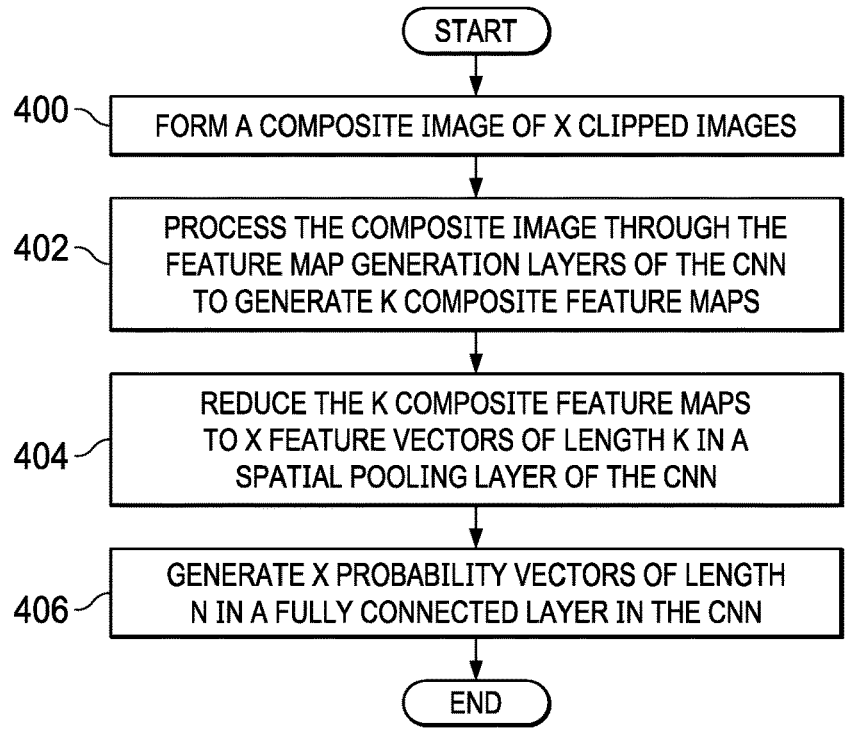
FIG. 4 is a flow diagram of a method for multi-label image classification in a CNN.

FIG. 4 is a flow diagram of a method for multi-label image classification in a CNN, e.g., the multi-label image classification CNN 220 of FIG. 2. Initially, an 3×P×Q composite image is formed 400 from X clipped images of size r×p×q, where p is the height of a clipped image, P is the height of the composite image, q is the width of a clipped image, Q is the width of the composite image, and r is the number of channels, e.g., for an RGB image, r=3. The clipped images may be of any suitable dimensions, e.g., 3×16×16 or 3×32×32, and the number and size of clipped images in the composite image may be selected based on various criteria such as the capabilities of deep learning accelerators in the hardware executing the CNN, the expected number and size of clipped images from a computer vision application using the CNN for classification, etc.

The composite image is then processed 402 through the feature map generation layers, e.g., the layers of the CNN before the spatial pooling layer 228, to generate K×P'×Q' composite feature maps where K is the number of feature maps, P' is the height of a composite feature map, and Q' is the width of a composite feature map. Each of the K composite feature maps includes X p'×q' feature maps, one for each p×q clipped image in the composite image. The values of K, P', p', Q', and q' depend on the functionality of the feature map generation layers, e.g., the number of filters applied in the last convolution layer, any striding performed in convolution layers and/or striding layers, and the amount of pooling performed by any pooling layers.

The K composite feature maps are then reduced 404 to X feature vectors of length K in a spatial pooling layer of the CNN. Spatial pooling is previously described herein in reference to the spatial pooling layer 228 of FIG. 2. The X feature vectors are then input to a fully connected layer of the CNN to generate 406 X probability vectors of length N, where N is the number of classes the CNN is designed to classify. The X probability vectors may then be individually processed by a Softmax layer (not shown) to generate a probability distribution between 0 and 1.0 for each vector.

Figure 5:
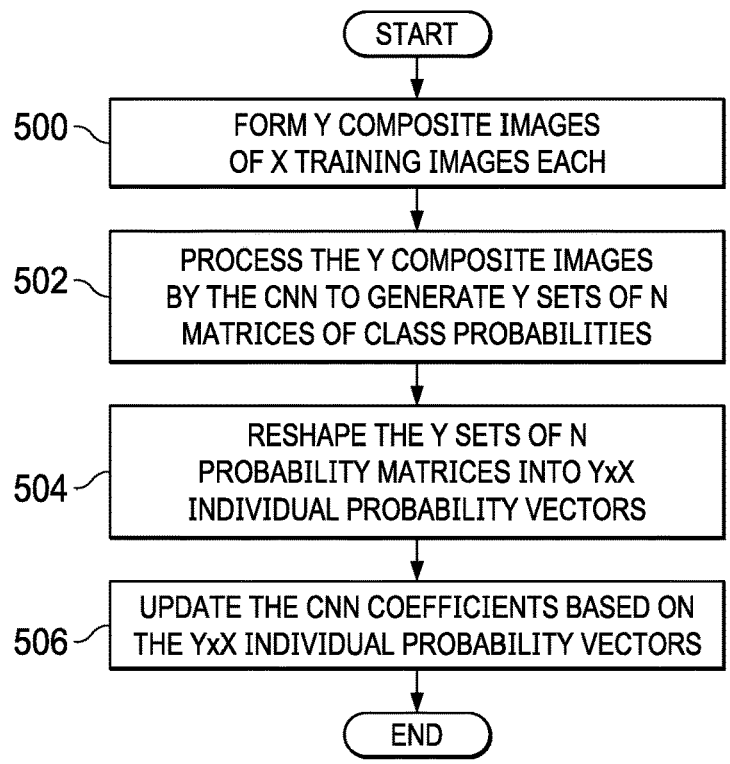
FIG. 5 is a flow diagram of a method for training a multi-label image classification CNN.

FIG. 5 is a flow diagram of a method for training a multi-label image classification CNN, e.g., the multi-label image classification CNN 220 of FIG. 2. The training approach is the previously described mini-batch training in which the set of training images is divided in multiple mini-batches in each epoch. This example illustrates the processing of one mini-batch. The illustrated mini-batch processing is repeated in each epoch for all mini-batches of the training set of images.

Initially, Y 3×P×Q composite images are formed 500 from X training images of size r×p×q, where p is the height of a training image, P is the height of a composite image, q is the width of a training image, Q is the width of a composite image, and r is the number of channels, e.g., for an RGB image, r=3. The training images are of the same dimensions as the clipped images the CNN expects as input, e.g., 3×16×16 or 3×32×32, and the number of training images in a composite image is the same as the number of clipped images expected in a composite image input to the CNN. The value of Y depends on the number of training images in a mini-batch, which may be selected as a multiple of the number of clipped images expected in a composite image by the CNN.

The Y composite images are then individually processed 502 through the CNN to generate Y sets of N P'×Q' matrices of class probabilities, where N is the number of classes the CNN is designed to classify. The values of P' and Q' depend on the functionality of the feature map generation layers, e.g., the number of filters applied in the last convolution layer, any striding performed in convolution layers and/or striding layers, and the amount of pooling performed by any pooling layers. Each P'×Q' probability matrix includes a probability value for each of the X training images in the corresponding composite image. The Y sets of N probability matrices are then reshaped 504 into Y×X individual probability vectors of length N, one for each of the Y×X training images. The CNN coefficients are then updated 506 based on the Y×X individual probability vectors. Reshaping and updating the CNN coefficients is previously described herein in reference to, respectively, the reshape component 328 and the network update component 308 of FIG. 3.

Figure 6:
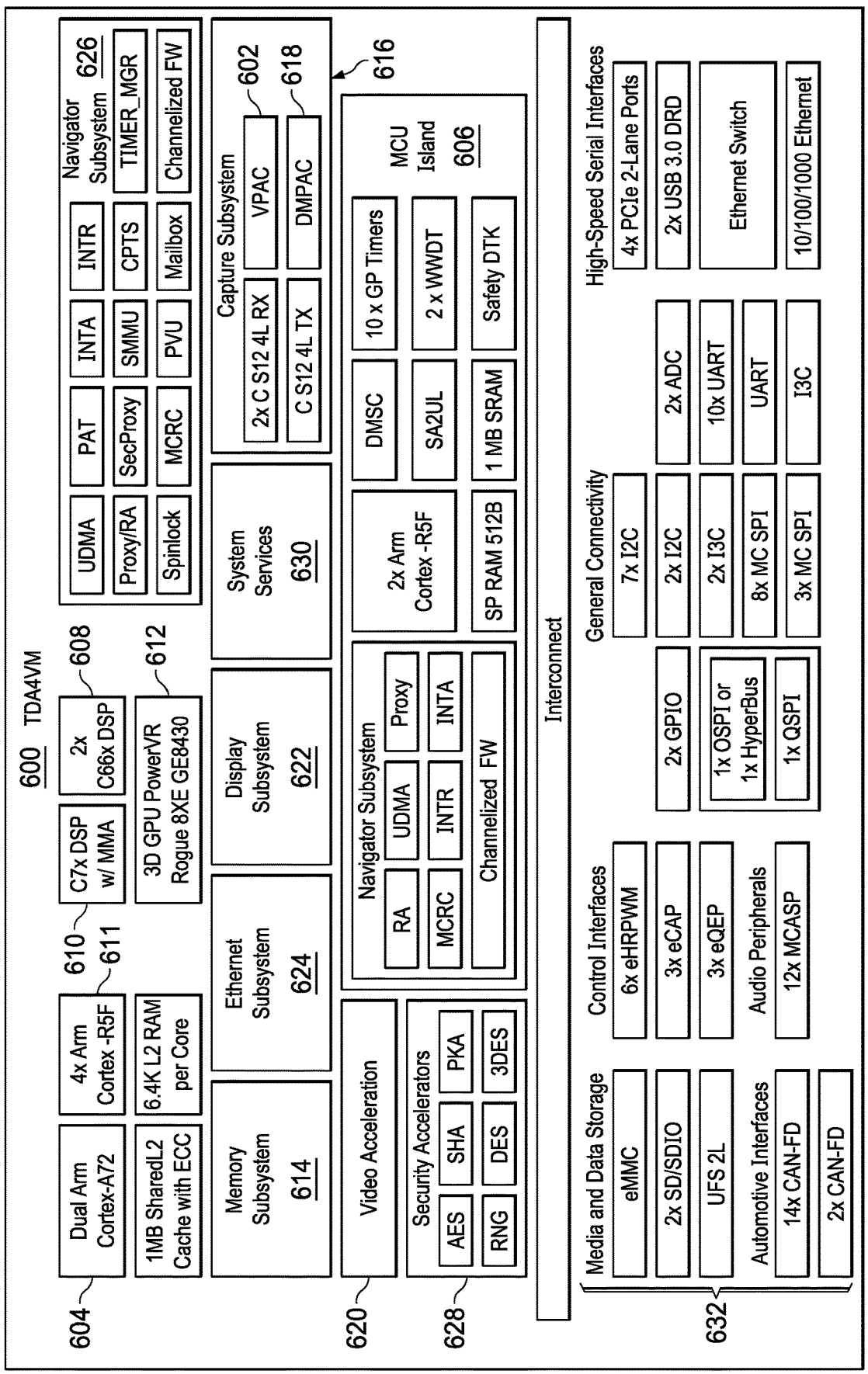
FIG. 6 is a high level block diagram of an example multiprocessor system-on-a-chip (SoC) that may execute a multi-label image classification CNN.

FIG. 6 is a high level block diagram of an example multiprocessor system-on-a-chip (SoC) 600 that may be configured to perform embodiments of a multi-label image classification CNN as described herein. In particular, the example SoC 600 is an embodiment of the TDA4VM SoC available from Texas Instruments, Inc. A high level description of the components of the SoC 600 is provided herein. More detailed descriptions of example components may be found in "TDA4VM Jacinto™ Automotive Processors for ADAS and Autonomous Vehicles Silicon Revisions 1.0 and 1.1," Texas Instruments, SPRSP36J, February, 2019, revised August, 2021, pp. 1-323, which is incorporated by reference herein.

The SoC 600 includes numerous subsystems across different domains such as one dual-core 64-bit Arm® Cortex®-A72 microprocessor subsystem 604, a microcontroller unit (MCU) island 606, based on two dual-core Arm® Cortex®-R5F MCUs, four additional dual-core Arm® Cortex®-R5F MCUs 611 in the main domain, two C66x floating point digital signal processors (DSPs) 608, one C71x floating point, vector DSP 610, that includes a deep-learning matrix multiply accelerator (MMA), and 3D graphics processing unit (GPU) 612. The SoC 600 further includes a memory subsystem 614 including up to 8 MB of on-chip static random access memory (SRAM), an internal DMA engine, a general purpose memory controller (GPMC), and an external memory interface (EMIF) module (EMIF). In addition, the SoC 600 includes a capture subsystem 616 with two camera streaming interfaces, a vision processing accelerator (VPAC) 602 including one or more image signal processors (ISPs), a depth and motion processing accelerator (DMPAC) 618, and a video acceleration module 620. The SoC 600 also includes a display subsystem 622, an ethernet subsystem 624, a navigator subsystem 626, various security accelerators 628, support for system services 630, and a variety of other interfaces 632.

Software instructions implementing an embodiment of a multi-label image classification CNN as described herein may be stored in the memory subsystem 614 (e.g., a computer readable medium) and may execute on one or more programmable processors of the SOC 600, e.g., the DSP 610.

FIG. 7 is a simplified block diagram of a computer system 700 that may be used implement training of a multi-label image classification CNN as described herein. The computer system 700 includes a processing unit 730 equipped with one or more input devices 704 (e.g., a mouse, a keyboard, or the like), and one or more output devices, such as a display 708, or the like. In some embodiments, the display 708 may be touch screen, thus allowing the display 708 to also function as an input device. The display may be any suitable visual display unit such as, for example, a computer monitor, an LED, LCD, or plasma display, a television, a high definition television, or a combination thereof.

The processing unit 730 includes a central processing unit (CPU) 718, memory 714, a storage device 716, a video adapter 712, an I/O interface 710, a video decoder 722, and a network interface 724 connected to a bus. The bus may be one or more of any type of several bus architectures including a memory bus or memory controller, a peripheral bus, video bus, or the like.

The CPU 718 may be any suitable type and suitable combination of electronic data processors. For example, the CPU 718 may include one or more processors from Intel Corp. or Advanced Micro Devices, Inc., one or more Reduced Instruction Set Computers (RISC), one or more Application-Specific Integrated Circuits (ASIC), one or more digital signal processors (DSP), or the like. The memory 714 may be any type of system memory such as static random access memory (SRAM), dynamic random access memory (DRAM), synchronous DRAM (SDRAM), read-only memory (ROM), flash memory, a combination thereof, or the like. Further, the memory 714 may include ROM for use at boot-up, and DRAM for data storage for use while executing programs.

The storage device 716 (e.g., a computer readable medium) may include any type of storage device configured to store data, programs, and other information and to make the data, programs, and other information accessible via the bus. The storage device 716 may be, for example, one or more of a hard disk drive, a magnetic disk drive, an optical disk drive, or the like. Software instructions implementing an embodiment of training a multi-label classification CNN as described herein may be stored on the storage device 716. Training images may also be stored on the storage device 716 or may be accessed via the network interface 724. The software instructions may be initially stored in a computer-readable medium such as a compact disc (CD), a diskette, a tape, a file, memory, or any other computer readable storage device and loaded and executed by the CPU 718. In some cases, the software instructions may also be sold in a computer program product, which includes the computer-readable medium and packaging materials for the computer-readable medium. In some cases, the software instructions may be distributed to the computer system 700 via removable computer readable media (e.g., floppy disk, optical disk, flash memory, USB key), via a transmission path from computer readable media on another computer system (e.g., a server), etc.

The video adapter 712 provides an interface to couple the display 708 to the processing unit 730. The I/O interface 710 provide interfaces to couple external input devices 704, e.g., a mouse/keyboard, to the processing unit 730.

The network interface 724 allows the processing unit 730 to communicate with remote units via a network. The network interface 724 may provide an interface for a wired link, such as an Ethernet cable or the like, and/or a wireless link via, for example, a local area network (LAN), a wide area network (WAN) such as the Internet, a cellular network, any other similar type of network and/or any combination thereof.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments are described herein using mini-batch training of a multi-label image classification CNN. In other embodiments, other approaches to training may be used, such as, for example modified versions of full batch training. In prior art full batch training, each epoch includes one forward propagation pass and one backward propagation pass over all the training images. For full batch training of a multi-label image classification CNN, the training images in the full batch can be formed into composite images as previously described herein.

In another example, some embodiments are described here as being adaptations of an existing single label image classification CNN and the training of such a CNN to create and train a multi-label image classification CNN. In other embodiments, the multi-label classification CNN may be a new design intended from the beginning to perform multi-label image classification.

In another example, some embodiments of a multi-label image classification CNN are described herein as executing on an SoC. In other embodiments, a multi-label image classification CNN as described herein may execute on any suitable configured digital device, e.g., a desktop computer, a laptop computer, a tablet, etc.

It is therefore contemplated that the appended claims will cover any such modifications of the embodiments as fall within the true scope of the disclosure.

What is claimed is:

1. A method for multi-label image classification in a convolutional neural network (CNN), the method comprising:
    forming a composite image from a plurality of clipped images by tiling the plurality of clipped images in a grid having columns and rows to form the composite image having a height equal to a sum of heights of a first subset of the plurality of clipped images forming a column and a width equal to a sum of widths of a second subset of the plurality of clipped images forming a row; and
    processing the composite image by the CNN to generate a plurality of probability vectors, each probability vector of the plurality of probability vectors uniquely corresponding to a clipped image of the plurality of clipped images, wherein a length of a probability vector is equal to a number of classes the CNN is designed to classify.

2. The method of claim 1, wherein processing the composite image further comprises:
    processing the composite image through feature map generation layers of the CNN to generate a plurality of composite feature maps, wherein a composite feature map includes a feature map for each clipped image of the plurality of clipped images; and generating a probability vector for each clipped image in the plurality of clipped images based on the feature maps for the clipped image.

3. The method of claim 2, wherein processing the composite image further comprises:
reducing the plurality of composite feature maps to a plurality of feature vectors using a spatial pooling layer of the CNN, wherein a length of a feature vector is equal to a number of composite feature maps in the plurality of composite feature maps and the plurality of feature vectors includes a feature vector for each clipped image of the plurality of clipped images.

4. The method of claim 3, wherein generating a probability vector further comprises processing the feature vector for each clipped image in at least one fully connected layer of the CNN.

5. The method of claim 3, wherein the spatial pooling layer downsamples each feature map in a composite feature map by taking an average of elements in the feature map.

6. The method of claim 2, wherein the feature map generation layers comprise one or more convolution layers.

7. The method of claim 1, wherein the CNN is adapted from a single label classification CNN by replacing a global pooling layer of the single label classification CNN with a spatial pooling layer and training the CNN using composite images formed from a plurality of training images.

8. A non-transitory computer readable medium storing software instructions for a multi-label image classification convolutional neural network (CNN), the software instructions comprising software instructions to:
form a composite image from a plurality of clipped images by tiling the plurality of clipped images in a grid having columns and rows to form the composite image having a height equal to a sum of heights of a first subset of the plurality of clipped images forming a column and a width equal to a sum of widths of a second subset of the plurality of clipped images forming a row; and
process the composite image by the CNN to generate a plurality of probability vectors, each probability vector of the plurality of probability vectors uniquely corresponding to a clipped image of the plurality of clipped images, wherein a length of a probability vector is equal to a number of classes the CNN is designed to classify.

9. The non-transitory computer readable medium of claim 8, wherein the software instructions to process the composite image further comprise software instructions to:
process the composite image through feature map generation layers of the CNN to generate a plurality of composite feature maps, wherein a composite feature map includes a feature map for each clipped image of the plurality of clipped images; and
generate a probability vector for each clipped image in the plurality of clipped images based on the feature maps for the clipped image.

10. The non-transitory computer readable medium of claim 9, wherein the software instructions to process the composite image further comprise software instructions to:
reduce the plurality of composite feature maps to a plurality of feature vectors using a spatial pooling layer of the CNN, wherein a length of a feature vector is equal to a number of composite feature maps in the plurality of composite feature maps and the plurality of feature vectors includes a feature vector for each clipped image of the plurality of clipped images.

11. The non-transitory computer readable medium of claim 10, wherein the software instructions to generate a probability vector further comprise software instructions to process the feature vector for each clipped image in at least one fully connected layer of the CNN.

12. The non-transitory computer readable medium of claim 10, wherein the spatial pooling layer downsamples each feature map in a composite feature map by taking an average of elements in the feature map.

13. The non-transitory computer readable medium of claim 9, wherein the feature map generation layers comprise one or more convolution layers.

14. The non-transitory computer readable medium of claim 8, wherein the CNN is adapted from a single label classification CNN by replacing a global pooling layer of the single label classification CNN with a spatial pooling layer and training the CNN using composite images formed from a plurality of training images.

15. A digital device comprising:
at least one processor; and
a memory storing software instructions for a multi-label image classification convolutional neural network (CNN) for execution by the at least one processor, the software instructions comprising software instructions to:
form a composite image from a plurality of clipped images by tiling the plurality of clipped images in a grid having columns and rows to form the composite image having a height equal to a sum of heights of a first subset of the plurality of clipped images forming a column and a width equal to a sum of widths of a second subset of the plurality of clipped images forming a row; and
process the composite image by the CNN to generate a plurality of probability vectors, each probability vector of the plurality of probability vectors uniquely corresponding to a clipped image of the plurality of clipped images, wherein a length of a probability vector is equal to a number of classes the CNN is designed to classify.

16. The digital device of claim 15, wherein the software instructions to process the composite image further comprise software instructions to:
process the composite image through feature map generation layers of the CNN to generate a plurality of composite feature maps, wherein a composite feature map includes a feature map for each clipped image of the plurality of clipped images; and
generate a probability vector for each clipped image in the plurality of clipped images based on the feature maps for the clipped image.

17. The digital device of claim 16, wherein the software instructions to process the composite image further comprise software instructions to:
reduce the plurality of composite feature maps to a plurality of feature vectors using a spatial pooling layer of the CNN, wherein a length of a feature vector is equal to a number of composite feature maps in the plurality of composite feature maps and the plurality of feature vectors includes a feature vector for each clipped image of the plurality of clipped images.

18. The digital device of claim 17, wherein the software instructions to generate a probability vector further comprise software instructions to process the feature vector for each clipped image in at least one fully connected layer of the CNN.

19. The digital device of claim 17, wherein the spatial pooling layer downsamples each feature map in a composite feature map by taking an average of elements in the feature map.

20. The digital device of claim 16, wherein the feature map generation layers comprise one or more convolution layers.

21. The digital device of claim 15, wherein the CNN is adapted from a single label classification CNN by replacing a global pooling layer of the single label classification CNN with a spatial pooling layer and training the CNN using composite images formed from a plurality of training images.

22. The digital device of claim 15, wherein the digital device comprises a system on a chip (SOC).

* * * * *